Feb. 14, 1961 K. D. ELWICK 2,971,391
IMPLEMENT DRIVING MECHANISM
Filed Aug. 4, 1958 2 Sheets-Sheet 1

INVENTOR.
K. D. ELWICK
ATTORNEYS

Feb. 14, 1961 K. D. ELWICK 2,971,391
IMPLEMENT DRIVING MECHANISM
Filed Aug. 4, 1958 2 Sheets-Sheet 2
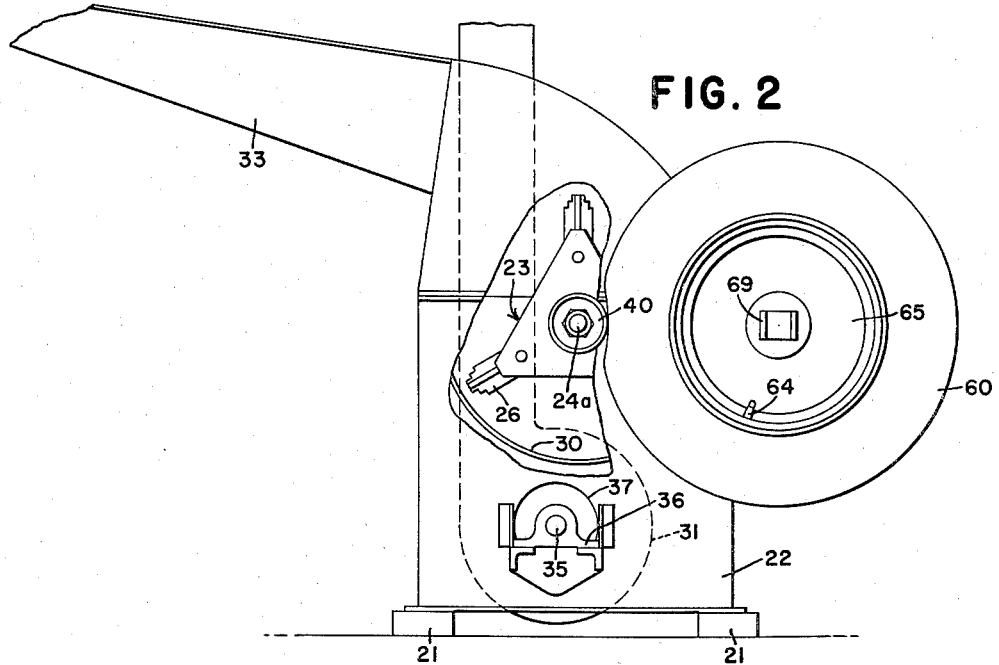
FIG. 2
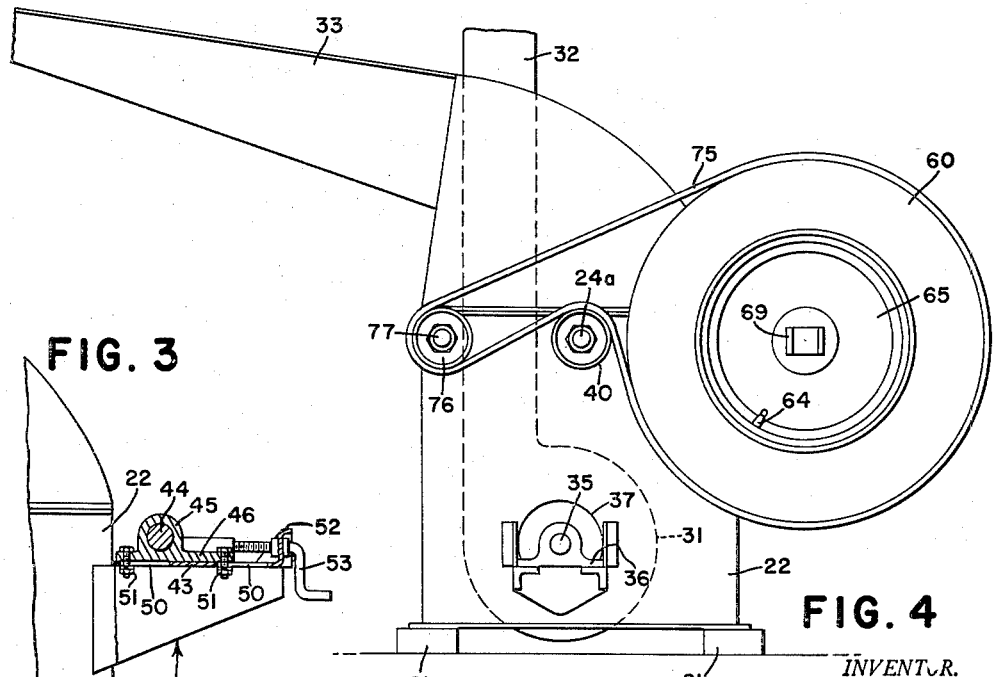
FIG. 3
FIG. 4
INVENTOR.
K. D. ELWICK
ATTORNEYS United States Patent Office 2,971,391
Patented Feb. 14, 1961

2,971,391
IMPLEMENT DRIVING MECHANISM
Keith D. Elwick, R.R. 3, Vinton, Iowa
Filed Aug. 4, 1958, Ser. No. 752,936
8 Claims. (Cl. 74—207)

This invention relates to a drive mechanism and more particularly to a drive mechanism extending between the power take-off shaft of a tractor and a material reducing unit.

In the conventional type of material reducing unit, there is provided a main frame including a housing structure. Supported in the housing structure is a rotor means formed about the axis of a rotor shaft which in turn has at least one of its ends extending outward of the housing structure. On the outwardly extending end of the main shaft is a pulley or similar type of power transmitting member which receives power generally indirectly from the main power source driving the material reducing unit. It is inherent in a material reducing unit that a type of slip clutch or other overload releasing device be provided between the main power source and the rotor means. This is for the purpose of providing a release device so that should a hard or metallic foreign object pass through the grinding unit, the rotor means will be permitted to be stopped prior to critical damage being done thereto. Also, there exists considerable shock load in the normal operation of a grinding or material reducing unit and consequently the drive extending between the main power source and the reducing unit must be of a type which is shock absorbent. It is conventional, therefore, to provide in the material reducing unit a drive normally including either V-belts or flat belts which extends between the main power source and the rotor means. However, the main problem or fault with this type of drive is that due to the varying surges in power requirement as well as the slippage which occurs due to the load on the belts, the life expectancy of a belt drive is relatively small. Consequently, there is considerable shut down of the unit for purposes of replacing the belts and also there is required care in feeding material into the reducing unit so as to eliminate extreme surges in load on the belts.

With the above in mind, it is the primary object of the present invention to provide a drive mechanism extending from the main power source to the rotor means which will permit a desired amount of slippage, which will be completely shock absorbent, and which will have a long life expectancy.

It is proposed and it is an object of the present invention to provide a drive means between the power take-off shaft of a tractor and the rotor means which includes a drive shaft on the reducing unit frame structure which is substantially parallel to the main shaft of the rotor means. Power will be transferred between the drive shaft and the power take-off shaft through conventional articulate means which causes the drive shaft to rotate in response to the rotation of the power take-off shaft. Power flow will extend between the drive shaft and the rotor shaft by means of a pulley and torus member having outer engageable surfaces. The pulley, which is mounted on the rotor shaft will be driven through frictional engagement with the outer surface of the torus member. The torus member will be composed of elastic material, such as rubber, to effect resilient contact with the pulley member. The torus member will also be constructed in the form of a sealed envelope or tube adapted for inflation or deflation to effect the degree of resiliency in the torus member. Should an abnormally large load be placed in the grinding area of the rotor means, the resilient characteristics of the torus will permit compression of the torus member so as to allow slippage on the pulley.

It is also proposed and it is also an object of the present invention to extend opposite ends of the rotor shaft outward of the housing and to mount the drive shaft substantially parallel to the rotor shaft with opposite ends thereof spaced on the order of and opposite respectively to the ends of the rotor shaft. For purposes of better balancing the load on the shaft and the housing structure, there will be provided pulleys on opposite ends of the rotor shaft and a cooperating pair of torus members on opposite ends respectively of the drive shaft. The drive shaft will be mounted on the main frame so as to permit minute adjustment of opposite ends of the shaft to insure precise contact between the pulleys and torus members.

It is also the object of the present invention to provide a modification of the invention featuring a pulley member on the rotor shaft and a torus member on the drive shaft which are spaced from and out of contact with one another. Mounted over the torus and pulley member is a flat belt which will operate to drive the rotor means. The advantage of the latter modification is that take-up may be made in the flat belt by inflating or deflating the torus member. Consequently, sufficient tension may be maintained in the flat belt so that only a nominal amount of slippage will occur.

Other objects and advantages of the invention will become apparent to those skilled in the art as the nature of the invention is better understood from the following description and as shown in the accompanying drawings.

Fig. 2 is a front view of the material reducing unit with portions of the unit being broken away to show internal mechanism.

Fig. 3 is a sectional view taken substantially along the line 3—3 of Fig. 1.

Fig. 4 is a front view similar to Fig. 2 showing a modified form of the invention.

Figure 1:
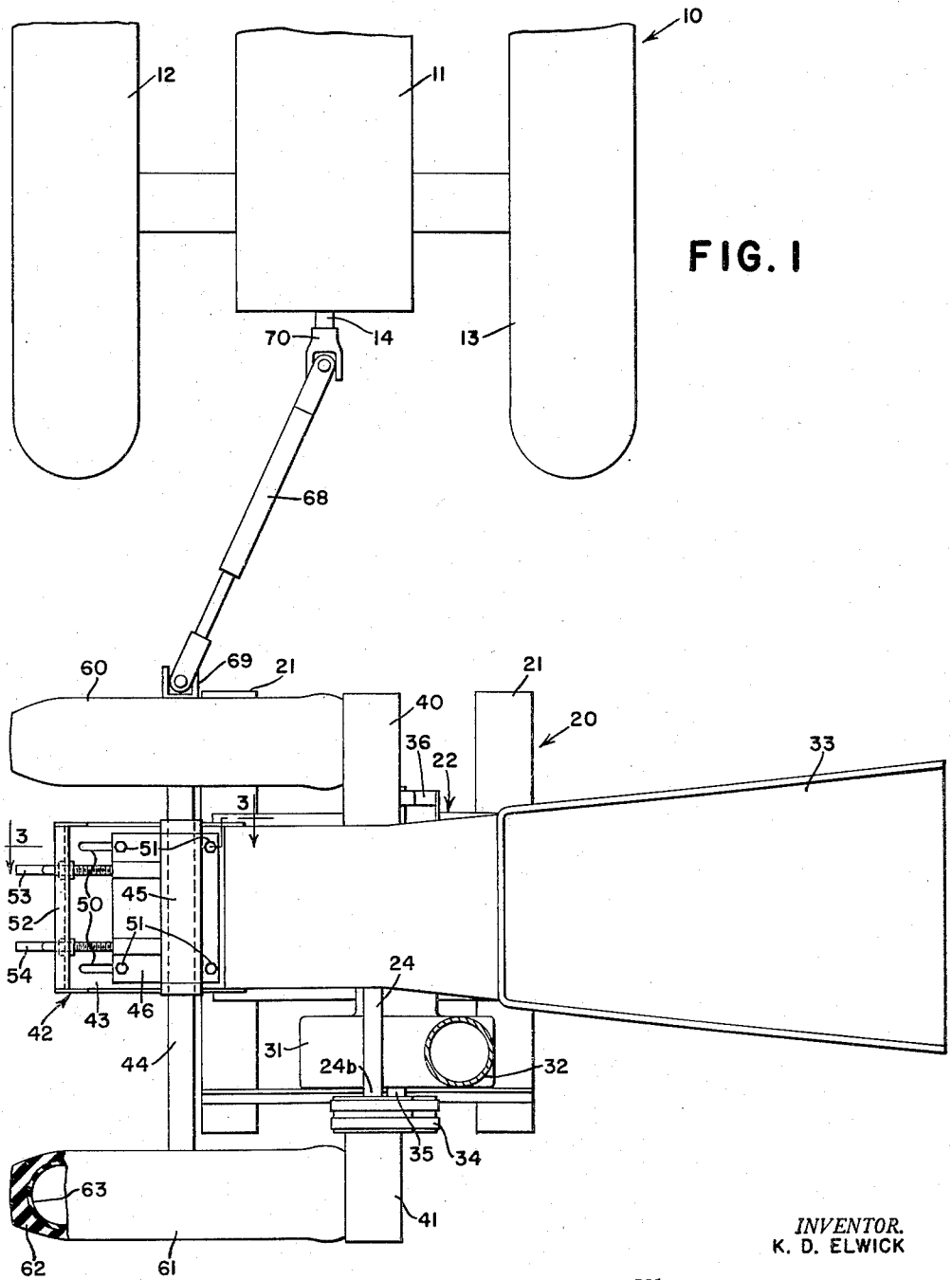
Fig. 1 is a plan view of the rear portion of a tractor and a material reducing unit with portions broken away for purposes of clarity.

Referring first to Fig. 1, there is therein provided a tractor 10 having an elongated body 11 supported between rear wheels 12, 13. Extending rearwardly from the body 11 is a power take-off shaft 14. The tractor generally is of conventional type and consequently is described only generally and not in detail. For purposes of illustration the material reducing unit, indicated in its entirety by the reference numeral 20, is of the hammer mill type and other than the drive mechanism is also more or less of conventional design. It should, however, be recognized that almost all types of material reducing units such as mills, shellers, etc. would operate successfully with the drive structure herein to be described. Consequently, details of the hammer mill will not be given but the entire material reducing unit will be described only generally. If further details are desired, such may be had by referring to U.S. Patent 2,421,124, issued to Mr. H. E. Korum.

The material reducing unit includes therein a ground support or frame 21 supporting a housing structure 22 in which is mounted a material reducing rotor 23. The rotor 23 includes a rotor drive shaft 24 on which is mounted a plurality of radially extending hammers 26. A semi-cylindrical screen 30 is disposed beneath the rotor 23 and retains the crop material for grinding action by the rotor hammers 26 until the material is of a desired fineness, after which it drops through the screen 30 into a trough, not shown, which gathers the material and feeds it outwardly to a centrifugal fan or blower 31 which discharges the ground material through a discharge duct 32. Material is normally fed into the material reducing area adjacent the rotor 23 and screen 30 by means of a trough-like structure 33 which gravity feeds material to the rotor.

The rotor drive shaft 24 has opposite ends 24a, 24b extending front and rear respectively of the housing structure 22. Positioned on the rear extension 24b is a V-belt drive 34 which extends downwardly to a drive shaft 35 of the fan 31 and provides power to drive the fan. The drive shaft 35 is supported on the housing 22 by means of supports 36. An air opening 37 is provided to feed air to the fan. Also mounted on the outer ends 24a, 24b of the rotor shaft 24 are a pair of driven elements in the form of pulleys 40, 41 respectively.

Extending outwardly from and rigidly mounted on the housing structure is additional supporting structure 42. The supporting structure 42 includes a pair of depending leg portions serving as trusses for a laterally extending plate portion 43. The structure 42 serves as support for a rotatable drive or support shaft 44. The shaft 44 is supported on the structure 43 by means of a centrally located bearing portion 45 with an integral downwardly facing plate portion 46 slidably engaged with the upper surface of the plate portion 43. A series of transverse slots 50 are provided in the plate portion 43 and receives bolt and nut combinations 51 extending through the portion 46. Obviously, by loosening the nuts on the combination 51, the plate portion 46 may be moved, unless otherwise restricted, transversely in the slots 50. The plate portion 43 is flanged upwardly at its outer end as indicated by the reference numeral 52. Extending through the flange portion 52 are a pair of fore-and-aft spaced crank shafts 53, 54 the inner ends of which are threaded into the end of the plate portion 46. Inasmuch as the crank members 53, 54 are fore-and-aft spaced, the entire bearing and shaft 44 may be adjusted angularly.

The shaft 44 is substantially parallel to the rotor shaft 24 and has opposite ends thereof spaced fore-and-aft on the order of and generally transversely opposite to the ends 24a, 24b of the rotor shaft 24. Mounted on opposite ends of the drive shaft 44 are a pair of torus or wheeled members 60, 61. The torus members 60, 61 are composed of outer annular portions composed of elastic material to provide an outer resilient type of surface and are mounted on inner webs, only one of which is shown at 65. For illustration purposes, the outer portion of the torus member 61 is shown (Fig. 1) as being formed of an outside carcass 62 with an inner sealed envelope in the form of a round endless tube 63 which is adapted for inflation or deflation to effect the resiliency of its outer surface, the inflation or deflation occurring through the medium of a stemmed valve indicated at 64. The torus members 60, 61 have their outer surfaces in direct contact with the driven members or pulleys 40, 41. Since the outer surface of the torus members 60, 61 are frictional, engagement of the members with the pulleys 40, 41 will effect rotation of the rotor shaft 24 in response to rotation of the drive shaft 44.

It should be recognized that for purposes of illustration, the present drive has been shown as consisting of a pair of torus members and pulleys on opposite ends of the shafts 44 and 24. It should be understood that this arrangement is provided for the purpose of obtaining balance of load on opposite ends of the shafts. However, while this should be recognized as the more ideal and efficient type of drive, it should also be understood that on smaller mills or material reducing units, a single torus member and pulley would be sufficient to operate the units and also on smaller units, since the load would be relatively light, the problem of balance is not of too great importance. Consequently, while the drive mechanisms have been shown and described as operating in pairs, a single drive mechanism would be sufficient in many instances.

From a practical standpoint it should be recognized that the use of used or old tires and tubes mounted on wheel frames would serve efficiently as the torus portion of the drive. Inasmuch as used tires will be worn to different degrees, it becomes important relative to the support of the shaft 44 that there be some adjustment provided to slightly angle the shaft 44 relative to the shaft 24. For this purpose, it becomes of particular value that the crank members 53, 54 are spaced fore-and-aft to effect this angular adjustment. As a result, should one tire be worn more than the other, a turn or two of either of the crank members 53, 54 should evenly balance the load between the wheeled members 60, 61.

Extending forwardly from the forward end of the shaft 44 is a telescoping type of drive shaft 68, the rear end of which has a universal joint 69 for connection to the shaft 44 and the forward end of which has a universal type joint 70 for connection to the power take-off shaft 14 on the tractor. The universal joints 69, 70 and telescoping shaft 68 serve the purpose of providing a degree of articulation between the tractor power take-off shaft 14 on the tractor. The universal joints 69, 70 the exact location of the tractor relative to the mill is not of major importance.

In the modification shown in Fig. 4, the torus or tire member is spaced transversely from the pulley 40 so that there is not direct contact between the outer surfaces of the torus member 60 and the pulley 40. In this modification, there is a flat belt or driven member 75 which extends over the torus member 60 and the pulley 40. For purposes of maintaining the drive in the same and correct direction of rotation there is further provided an idler shaft 77 and an idler or reverse pulley 76 over which the belt is also passed. It should be recognized that while only the forward portion of the drive mechanism of the modification is shown, obviously a similar flat belt drive may exist to the rear of the housing structure 22. This would indicate that the driving mechanisms could operate in pairs or as a single unit as described relative to the previous form of the invention. In the manner of operation, the drive is similar to the previous form with the obvious exception that the pulley 40 and shaft 24 is driven by means of the belt rather than by direct contact with the torus member 60.

While only one modification of the invention has been shown, it should be recognized that other forms and variations could occur to those skilled in the art without departing from the broad general principles disclosed herein. Therefore, while the invention has been shown and described in detail for purposes of clearly and concisely illustrating the principles of the invention, it should be recognized that there is no intention to narrow or limit the invention beyond the broad general principles herein claimed.

What is claimed is:

1. In a combination of tractor and material reducing unit in which the tractor has a rearwardly extending power take-off shaft and the material reducing unit has a main frame including housing structure, a material reducing rotor supported in the housing structure including a rotor shaft having opposite ends extending outwardly respectively of the housing structure, the improvement residing in drive means effecting rotation of the rotor shaft comprising: a support shaft substantially parallel to the rotor shaft and having opposite ends spaced on the order of and opposite respectively of the ends of the rotor shaft; a pair of pulleys mounted respectively on opposite ends of the rotor shaft; a pair of torus members mounted on opposite ends of the support shaft and having outer frictional surfaces engageable respectively with the pulleys, said torus members being composed of elastic material to effect resilient contact with the pulleys and being formed of a sealed envelope adapted for inflation or deflation to effect resiliency in the torus members; means mounting the support shaft on the main frame; and articulate connecting means between the power take-off shaft and the support shaft for effecting rotation of the torus members in response to rotation of the power take-off shaft.

2. In a combination of tractor and material reducing unit in which the tractor has a rearwardly extending power take-off shaft and the material reducing unit has a main frame including housing structure, a material reducing rotor supported in the housing structure including a rotor shaft having opposite ends extending outwardly respectively of the housing structure, the improvement residing in drive means effecting rotation of the rotor shaft comprising: a support shaft substantially parallel to the rotor shaft and having opposite ends spaced on the order of and opposite respectively of the ends of the rotor shaft; a pair of pulleys mounted respectively on opposite ends of the rotor shaft; a pair of torus members mounted on opposite ends of the support shaft and having outer frictional surfaces engageable respectively with the pulleys, said torus members being composed of elastic material to effect resilient contact with the pulleys; means mounting the support shaft on the main frame; and articulate connecting means between the power take-off shaft and the support shaft for effecting rotation of the torus members in response to rotation of the power take-off shaft.

3. In a combination of tractor and material reducing unit in which the tractor has a rearwardly extending power take-off shaft and the material reducing unit has a main frame including housing structure, a material reducing rotor supported in the housing structure including a rotor shaft, the improvement residing in drive means effecting rotation of the rotor shaft comprising: a support shaft substantially parallel to the rotor shaft; a pulley mounted on the rotor shaft; a torus member mounted on the support shaft and having an outer frictional surface engageable with the pulley, said torus member being composed of elastic material to effect resilient contact with the pulley; means mounting the support shaft on the main frame; an articulate connecting means between the power take-off shaft and the support shaft for effecting rotation of the torus member in response to rotation of the power take-off shaft.

4. In a combination of tractor and material reducing unit in which the tractor has a rearwardly extending power take-off shaft and the material reducing unit has a main frame including housing structure, a material reducing rotor supported in the housing structure including a rotor drive shaft, the improvement residing in drive means effecting rotation of the rotor drive shaft comprising: a support shaft substantially parallel to the rotor shaft; a torus member supported on the support shaft and having an outer frictional surface, said torus member being composed of elastic material to effect a resilient outer surface and being formed of a sealed envelope adapted for inflation or deflation to effect resiliency in the torus member; means mounting the support shaft on the main frame; a driven element in contact with the outer surface of the torus member and operatively associated with the rotor drive shaft for effecting rotation of the latter upon rotation of the torus member, and articulate connecting means between the support shaft and the power take-off shaft for effecting rotation of the torus member in response to rotation of the power take-off shaft.

5. In a combination of tractor and material reducing unit in which the tractor has a rearwardly extending power take-off shaft and the material reducing unit has a main frame including housing structure, a material reducing rotor supported in the housing structure including a rotor drive shaft, the improvement residing in drive means effecting rotation of the rotor drive shaft comprising: a support shaft substantially parallel to the rotor drive shaft; a torus member supported on the support shaft and having an outer frictional surface, said torus member being composed of elastic material to effect a resilient outer surface; means mounting the support shaft on the main frame; a driven element in contact with the outer surface of the torus member and operatively associated with the rotor drive shaft for effecting rotation of the latter upon rotation of the torus member, and articulate connecting means between the support shaft and the power take-off shaft for effecting rotation of the torus member in response to rotation of the power take-off shaft.

6. The invention defined in claim 5 in which the driven element is a flat belt, and the flat belt is operatively associated with the rotor drive shaft by means of a flat belt pulley mounted on the rotor drive shaft, the flat belt extending over the pulley and torus member.

7. The invention defined in claim 5 in which the driven element is a pulley mounted on the rotor shaft having an outer surface in frictional engagement with the outer surface of the torus member.

8. The invention defined in claim 5 in which the means mounting the support shaft on the main frame is adjustable to effect the proximity between the outer surface of the torus member and the driven element.

References Cited in the file of this patent

UNITED STATES PATENTS

| | | |
|---|---|---|
| 584,522 | Rich | June 15, 1897 |
| 1,291,768 | Cole | Jan. 21, 1919 |
| 1,436,373 | Walk | Nov. 21, 1922 |
| 2,072,400 | Hofer | Mar. 2, 1937 |
| 2,111,422 | Fawick | Mar. 15, 1938 |
| 2,590,675 | Bottorff | Mar. 25, 1952 |
| 2,803,142 | Kauffman | Aug. 20, 1957 |
| 2,865,264 | Moser | Dec. 23, 1958 |

FOREIGN PATENTS

| | | |
|---|---|---|
| 782,851 | France | Mar. 25, 1935 |